United States Patent [19]
Rosenberg et al.

[11] Patent Number: 5,701,140
[45] Date of Patent: *Dec. 23, 1997

[54] METHOD AND APPARATUS FOR PROVIDING A CURSOR CONTROL INTERFACE WITH FORCE FEEDBACK

[75] Inventors: Louis B. Rosenberg, Pleasanton; Bernard G. Jackson, Atherton, both of Calif.

[73] Assignee: Immersion Human Interface Corp., San Jose, Calif.

[*] Notice: The term of this patent shall not extend beyond the expiration date of Pat. No. 5,576,727.

[21] Appl. No.: 583,032

[22] PCT Filed: Jul. 12, 1994

[86] PCT No.: PCT/US94/07851

§ 371 Date: Feb. 16, 1996

§ 102(e) Date: Feb. 16, 1996

[87] PCT Pub. No.: WO95/02801

PCT Pub. Date: Jan. 26, 1995

[51] Int. Cl.$^6$ .................................. G09G 3/33
[52] U.S. Cl. .................. 345/156; 345/157; 345/158; 345/162
[58] Field of Search ............................. 345/157, 158, 345/162, 156

[56] References Cited

U.S. PATENT DOCUMENTS

| | | | |
|---|---|---|---|
| 2,906,179 | 9/1959 | Bower | 90/13.5 |
| 3,531,868 | 10/1970 | Stevenson | 33/174 |
| 3,890,958 | 6/1975 | Fister et al. | 128/2 S |
| 3,944,798 | 3/1976 | Eaton | 3/56 |
| 4,216,467 | 8/1980 | Colston | 340/365 L |
| 4,477,973 | 10/1984 | Davies | 33/1 CC |
| 4,571,834 | 2/1986 | Fraser et al. | 33/1 PT |
| 4,593,470 | 6/1986 | Davies | 33/1 CC |
| 4,632,341 | 12/1986 | Repperger et al. | 244/230 |

(List continued on next page.)

FOREIGN PATENT DOCUMENTS

| | | |
|---|---|---|
| 434610A | 5/1992 | Japan . |
| 2254911 | 10/1992 | United Kingdom . |
| WO9502801 | 1/1995 | WIPO . |
| WO9520787 | 8/1995 | WIPO . |
| WO9520788 | 8/1995 | WIPO . |
| WO9616397 | 5/1996 | WIPO . |
| WO9622591 | 7/1996 | WIPO . |

OTHER PUBLICATIONS

McAffee, Douglas A., "Teleoperator System/Telerobot Demonstrator: Force Reflecting Hand Controller Equipment Manual," JPL Jan. 1988, pp. 3–8, 11, and A–34.

Howe, Robert D., "Task Performance with a Dextrous Teleoperated Hand System," Proceedings of SPIE, Nov. 1992, vol. 1833, pp. 1–9.

(List continued on next page.)

*Primary Examiner*—Richard Hjerpe
*Assistant Examiner*—Joseph Acosta
*Attorney, Agent, or Firm*—Hickman Beyer & Weaver

[57] ABSTRACT

A method and apparatus for use with a computer for providing commands to a computer through tracked manual gestures and for providing feedback to the user through forces applied to the interface. A user manipulatable object is coupled to a mechanical linkage which is, in turn, supportable on a fixed surface. The mechanical linkage or the user manipulatable object is tracked by sensors for sensing the location and/or orientation of the object. A multi-processor system architecture is disclosed wherein a host computer system is interfaced with a dedicated microprocessor which is responsive to the output of the sensors and provides the host computer with information derived from the sensors. The host computer has an application program which responds to the information provided via the microprocessor and which can provide force-feedback commands back to the microprocessor, which is felt by a user via the user manipulatable object.

85 Claims, 9 Drawing Sheets

U.S. PATENT DOCUMENTS

| | | | |
|---|---|---|---|
| 4,638,798 | 1/1987 | Shelden et al. | 128/303 B |
| 4,653,011 | 3/1987 | Iwano | 364/513 |
| 4,654,648 | 3/1987 | Herrington et al. | 340/710 |
| 4,670,851 | 6/1987 | Murakami et al. | 364/518 |
| 4,676,002 | 6/1987 | Slocum | 33/1 MP |
| 4,679,331 | 7/1987 | Koontz | 33/551 |
| 4,688,983 | 8/1987 | Lindbom | 414/735 |
| 4,703,443 | 10/1987 | Moriyasu | 364/559 |
| 4,750,487 | 6/1988 | Zanetti | 128/303 B |
| 4,769,763 | 9/1988 | Trieb et al. | 364/559 |
| 4,787,051 | 11/1988 | Olson | 364/518 |
| 4,791,934 | 12/1988 | Brunnett | 128/653 |
| 4,800,721 | 1/1989 | Cemenska et al. | 60/393 |
| 4,811,608 | 3/1989 | Hilton | 73/862.04 |
| 4,819,195 | 4/1989 | Bell et al. | 364/571.05 |
| 4,839,838 | 6/1989 | LaBiche et al. | 364/709.11 |
| 4,849,692 | 7/1989 | Blood | 324/208 |
| 4,879,556 | 11/1989 | Duimel | 341/20 |
| 4,888,877 | 12/1989 | Enderle et al. | 33/559 |
| 4,891,889 | 1/1990 | Tomelleri | 33/503 |
| 4,907,970 | 3/1990 | Meenen, Jr. | 434/45 |
| 4,907,973 | 3/1990 | Hon | 434/262 |
| 4,942,545 | 7/1990 | Sapia | 364/571.01 |
| 4,945,305 | 7/1990 | Blood | 324/207.17 |
| 4,945,501 | 7/1990 | Bell et al. | 364/571.05 |
| 4,961,138 | 10/1990 | Gorniak | 364/200 |
| 4,961,267 | 10/1990 | Herzog | 33/503 |
| 4,962,591 | 10/1990 | Zeller et al. | 33/502 |
| 4,982,504 | 1/1991 | Söderberg et al. | 33/502 |
| 5,007,085 | 4/1991 | Greanias et al. | 380/25 |
| 5,007,300 | 4/1991 | Siva | 74/471 X |
| 5,040,306 | 8/1991 | McMurtry et al. | 33/556 |
| 5,050,608 | 9/1991 | Watanabe et al. | 128/653 R |
| 5,072,361 | 12/1991 | Davis et al. | 364/167.01 |
| 5,088,046 | 2/1992 | McMurtry | 364/474.03 |
| 5,088,055 | 2/1992 | Oyama | 364/560 |
| 5,095,303 | 3/1992 | Clark et al. | 340/710 |
| 5,103,404 | 4/1992 | McIntosh | 318/568.22 |
| 5,116,051 | 5/1992 | Moncrief et al. | 273/448 B |
| 5,128,671 | 7/1992 | Thomas, Jr. | 341/20 |
| 5,131,844 | 7/1992 | Marinaccio et al. | 433/72 |
| 5,132,672 | 7/1992 | Clark | 340/710 |
| 5,139,261 | 8/1992 | Openiano | 273/148 B |
| 5,142,506 | 8/1992 | Edwards | 367/127 |
| 5,142,931 | 9/1992 | Menahem | 74/471 X |
| 5,143,505 | 9/1992 | Burdea et al. | 414/5 |
| 5,148,377 | 9/1992 | McDonald | 364/560 |
| 5,181,181 | 1/1993 | Glynn | 364/566 |
| 5,182,557 | 1/1993 | Lang | 341/20 |
| 5,184,306 | 2/1993 | Erdman et al. | 364/474.05 |
| 5,184,319 | 2/1993 | Kramer | 364/806 |
| 5,185,561 | 2/1993 | Good et al. | 318/20 |
| 5,187,874 | 2/1993 | Takahashi et al. | 33/502 |
| 5,189,806 | 3/1993 | McMurtry et al. | 33/503 |
| 5,204,824 | 4/1993 | Fujimaki | 364/474.03 |
| 5,209,131 | 5/1993 | Baxter | 73/865.8 |
| 5,216,948 | 6/1993 | Mitchell et al. | 364/474.03 |
| 5,220,260 | 6/1993 | Schuler | 318/561 |
| 5,223,776 | 6/1993 | Radke et al. | 318/568.1 |
| 5,228,356 | 7/1993 | Chuang | 75/471 X |
| 5,230,623 | 7/1993 | Guthrie et al. | 433/72 |
| 5,243,266 | 9/1993 | Kasagami et al. | 318/568.1 |
| 5,251,127 | 10/1993 | Raab | 364/413.13 |
| 5,251,156 | 10/1993 | Heier et al. | 364/559 |
| 5,259,120 | 11/1993 | Chapman et al. | 33/502 |
| 5,259,894 | 11/1993 | Sampson | 156/64 |
| 5,264,768 | 11/1993 | Gregory et al. | 318/561 |
| 5,275,565 | 1/1994 | Moncrief | 434/29 |
| 5,296,846 | 3/1994 | Ledley | 345/161 |
| 5,351,692 | 10/1994 | Dow et al. | 128/662.06 |
| 5,354,162 | 10/1994 | Burdea et al. | 414/5 |
| 5,379,663 | 1/1995 | Hara | 74/471 X |
| 5,384,460 | 1/1995 | Tseng | 250/231.14 |
| 5,389,865 | 2/1995 | Jacobus et al. | 318/568.11 |
| 5,397,323 | 3/1995 | Taylor et al. | 606/130 |
| 5,402,582 | 4/1995 | Raab | 33/503 |
| 5,405,152 | 4/1995 | Katanics et al. | 273/438 |
| 5,412,880 | 5/1995 | Raab | 33/503 |
| 5,414,337 | 5/1995 | Schuler | 318/561 |
| 5,417,696 | 5/1995 | Kashuba et al. | 606/9.1 |
| 5,428,748 | 6/1995 | Davidson et al. | 395/275 |
| 5,429,140 | 7/1995 | Burdea et al. | 128/774 |
| 5,436,542 | 7/1995 | Petelin et al. | 318/567 |
| 5,445,166 | 8/1995 | Taylor | 128/897 |
| 5,459,382 | 10/1995 | Jacobus et al. | 318/568.11 |
| 5,467,763 | 11/1995 | McMahon et al. | 600/201 |
| 5,512,919 | 4/1996 | Araki | 345/156 |
| 5,576,727 | 11/1996 | Rosenberg et al. | 345/179 |
| 5,591,924 | 1/1997 | Hilton | 73/862.043 |

OTHER PUBLICATIONS

Snow, E. et al., "Compact Force–Reflecting Hand Controller," JPL, Apr. 1991, vol. 15, No. 3, Item No. 153, pp. 1–15a.

Kotoku, Tetsuo, "A Predictive Display with Force Feedback and its Application to Remote Manipulation System with Transmission Time Display," IEEE 1992, Jul. 7–10, 1992, pp. 239–246.

Iwata, Hiroo, "Pen–based Haptic Virtual Environment," Institute of Engineering Mechanics, University of Tsukuba, Japan, pp. 287–292.

Tavkhelidze, D.S., "Kinematic Analysis of Five–Ink Spherical Mechanisms", Mechanism and Machine Theory, 1974, vol. 9, pp. 181–190.

"Cursor Waldo," Designer's Corner–Useful Technology for Your Idea File, Design News, Mar. 7, 1993, p. 63.

"High Performance Model of the Immersion Probe," Immersion Probe–MD™, Immersion Corporation.

"3D Human Interface Tool," Immersion Probe™, Immersion Corporation.

"The Personal Digitizer™," Immersion Corporation.

"Foot–Operated Mouse," IBM Technical Disclosure Bulletin, Apr. 1986, vol. 28, No. 11.

Kenneth Meyer et al., "Survey of Position Trackers," The Massachuetts Institute of Technology Spring 1992, vol. 1, No. 2, pp. 173–200.

Smith, Geoffrey, "Call It Palpable Progress," *Business Week*, Oct. 9, 1995, pp. 93, 96.

Rosenberg, Louis B., *Perceptual Design of A Virtual Rigid Surface Contact*, Center for Design Research, Stanford University, Armstrong Laboratory, AL/CF–TR–1995–0029, Apr. 1993.

Jacobsen, S.C. et al., "High Performance, High Dexterity, Force Reflective Teleoperator II," ANS Topical Meeting on Robotics & Remote Systems, Albuquerque, New Mexico Feb. 24–27, 1991, p. 1–10.

Kotoku, Tetsuo et al., "Environment Modeling for the Interactive Display (EMID) Used in Teleobotic Systems," IEEE Nov. 3–5, 1991, pp. 99–1004.

Bejczy, Antal K., "The Phantom Robot:Predictive Displays for Teleoperation with Time Delay," IEEE 1990, pp. 546–550.

Buttolo, Pietro et al., "Pen–Based Force Display for Precision Manipulation in Virtual Environments," IEEE Mar. 1995, pp.1–8.

Tan, Hong Z. et al., "Human Factors for the Design of Force-Reflecting Haptic Interfaces," Tan, Srinivasan, Eberman, & Chang, ASME WAM 1994, pp.1–11.

Ellis, R.E. et al., "Design and Evalusation of a High-Performance Prototype Planar Haptic Interface," ASME Dec. 3,1993,DSC–vol. 49, pp.55–64.

Adelstein Bernard D. et al., "A High Performance Two Degree-of-Freedom Kinesthetic Interface," Massachusetts Institute of Technology 1992, pp. 108–112.

Colgate J. Edward et al., "Implementation of Stiff Virtual Walls in Force-Reflecting Interfaces", Sep. 22, 1993.

Iwata, Hiroo et al, "Volume Haptization", IEEE 1993, pp. 16–18.

Fischer, Patrick et al., "Specification and Design of Input Devices for Teleoperation," 1990.

Burdea, Grigore et al., "Distributed Virtual Force Feedback," IEEE, May 2, 1993, pp. 25–44.

Rosenberg, Louis B., "The Use of Virtual Fixtures as Perceptual Overlays to Enhance Operator Performance in Remote Environments," Air Force Material Command, Sep.1992, pp.1–42.

Rosenberg, Louis B., "The Use of Virtual Fixtures to Enhance Operator Performance in Time Delayed Teleoperation", Crew Systems Directorate Biodynamics and Biocommunications Division Wright-Patterson, Air Force Material Command, Mar. 1993, pp.1–45.

Burdea,Grigore et al., "A Portable Dextrous Master with Force Feedback," *Presence: Teleoperators and Virtual Environments,* MIT Press, Jun. 1991.

Rosenberg, Louis B., et al., "Perceptual Decomposition of Virtual Haptic Surfaces," IEEE, Oct.1993.

Rosenberg, Louis B., "Virtual Fixtures as Tools to Enhance Operator Performance in Telepresence Environments," SPIE Telemanipulator Technology, 1993.

Rosenberg, Louis B., "Virtual Haptic Overlays Enhance Performance in Telepresence Tasks," SPIE 1994.

Burdea, Grigore et al., "Dextrous Telerobotics with Force Feedback–An Overview," Robotica 1991, vol. 9.

Colgate, J. Edward et al., "Implementation of Stiff Virtual Walls in Force-Reflecting Interfaces," 1993, pp. 1–9.

Yamakita, M. et al., "Tele–Virtual Reality of Dynamic Mechanical Model", IEEE Jul.7–10, 1992, pp. 1103–1110.

Adlestein, Bernard D. et al., "Design and Implementation of a Force Reflecting Manipulandum for Manual Control Research," 1992, pp. 1–24.

Ouh–young, Ming et al., "Force Display Performs Better than Visual Display in a Simple 6–D Docking Task," IEEE 1989, pp. 1462–1466.

Kim, Won S. et al., "Graphics Displays for Operator Aid in Telemanipulation," IEEE 1991, pp. 1059–1067.

Hannaford, Blake et al., "Performance Evaluation of a Six–Axis Generalized Force-Reflecting Teleoperator," IEEE May/Jun. 1991, vol. 21, No. 3, pp. 620–633.

Kim, Won S. et al., "A Teleoperation Training Simulator with Visual and Kinesthetic Force Virtual Reality", Human Vision, Visual Proceedings, Proc. SPIE 1666, San Jose, CA, Feb. 1992.

Minsky, Margaret et al., "Feeling and Seeing: Issues in Force Display," ACM 1990, pp.235–242.

Herndon, J.N. et al., "The State-of-the-Art Model M–2 Maintenance System," Proceedings of the 1984 National Topical Meeting on Robotics and Remote Handling in Hostile Environments, American Nuclear Society, pp. 59–65.

Batter, James J. et al., "Grope–1: A Computer Display to the Sense of Feel," pp. TA–4–18–TA–4–192.

Gotow, J.K., et al., "Perception of Mechanical Properties at the Man–Machine Interface," IEEE 1987, pp. 688–689.

"Procedings of the IFIP Congress 65," International Federation for Information Processing, Information Processing 1965, vol. 3, New York, May 24–29, 1965, p. 506.

Atkinston, William D. et al, "Computing with Feeling," Comput. & Graphics, vol. 2, No. 2–E, pp. 97–103.

Noll, A. Michael, "Man–Machine Tactile Communication Dissertation," Polytechnic Institute of Brooklyn, Jun. 1971, pp. 1–88.

Ouh–Young, Ming, "Force Display in Molecular Docking," Chapel Hill 1990, pp. 1–85.

Ouh–young, Ming et al., "Using a Manipulator for Force Display in Molecular Docking," IEEE 1988, pp. 1824–1829.

Wiker, Steven F. et al., "Development of Tactile Mice for Blind Access to Computers: Importance of Stimulation Locus, Object Size,and Vibrotactile Display Resolution," Proceedings of the Human Factors Society 35th Annual Meeting 1991, pp. 708–712.

"Foot–Operatde Mouse," IBM Technical Disclosure Bulletin, Apr. 1986, vol. 28, No. 11.

Fisher, S.S. et al., "Virtual Environment Display System," ACM 1986 Workshop on Interactive 3D Graphics Oct. 23–24.

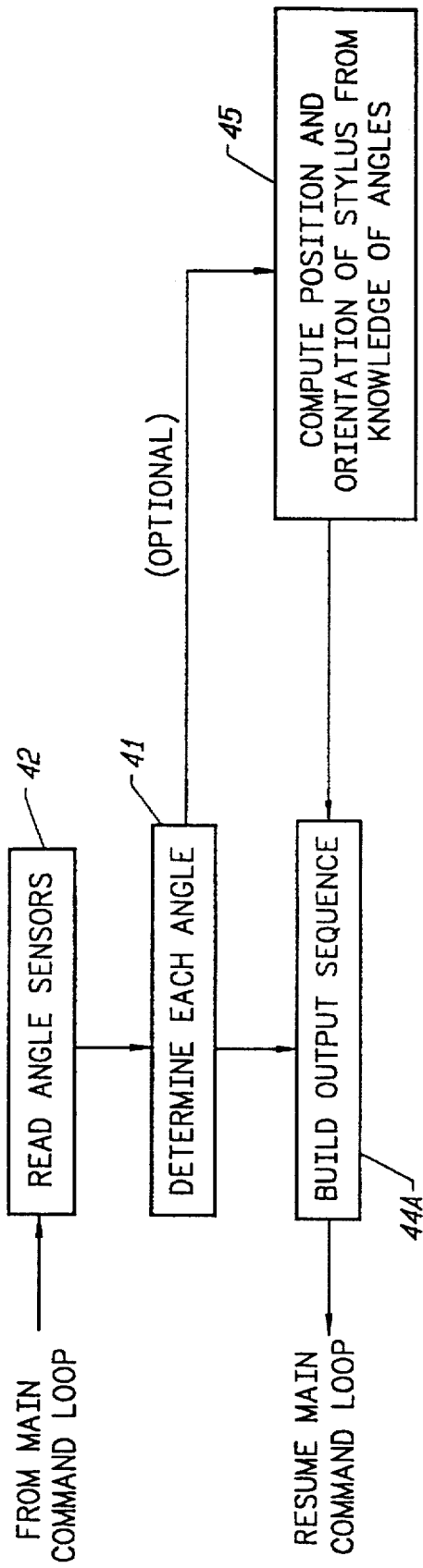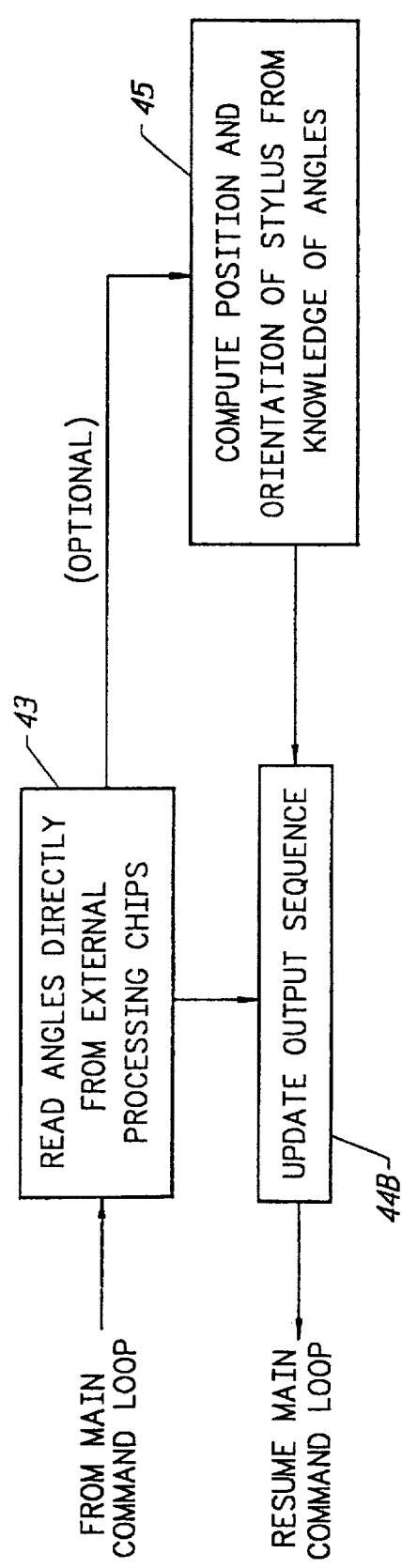
FIG. 4B.
FIG. 4A

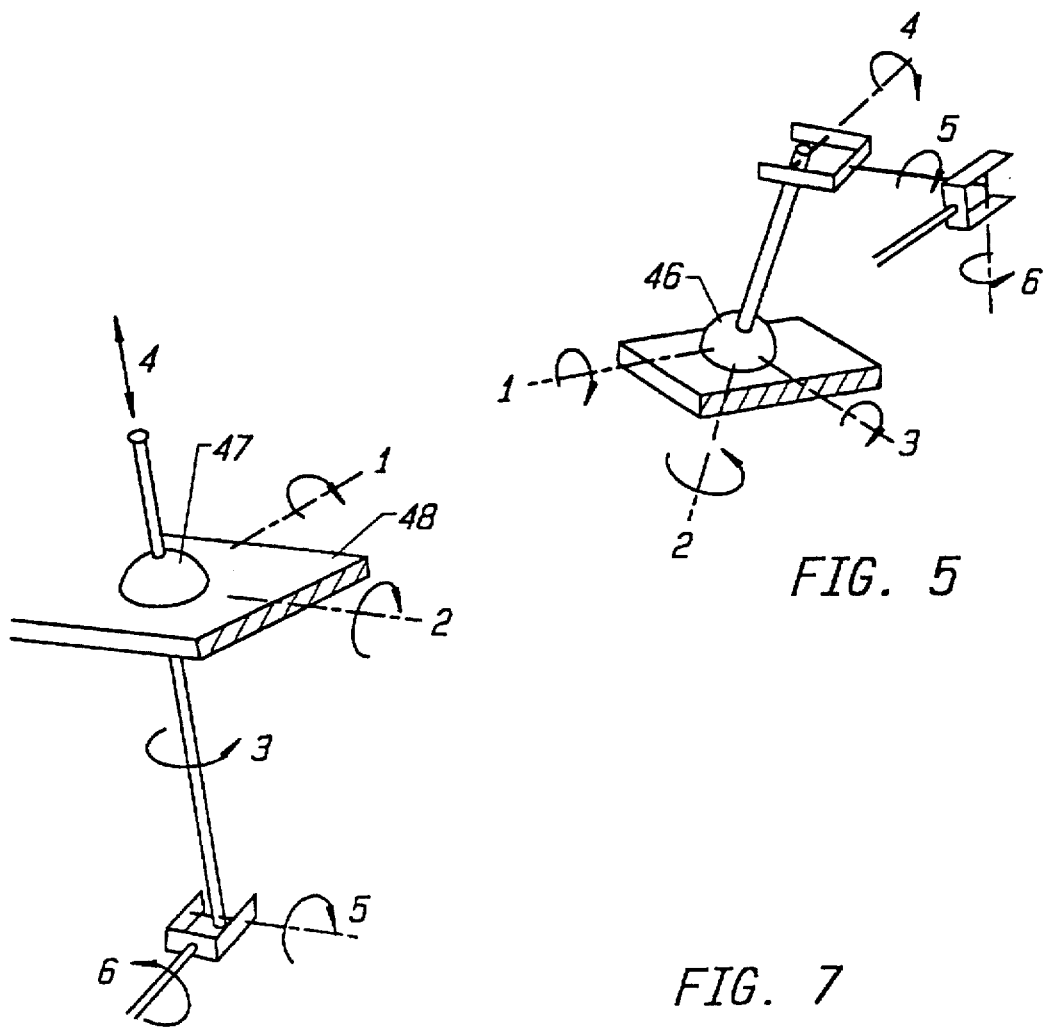
FIG. 5
FIG. 6
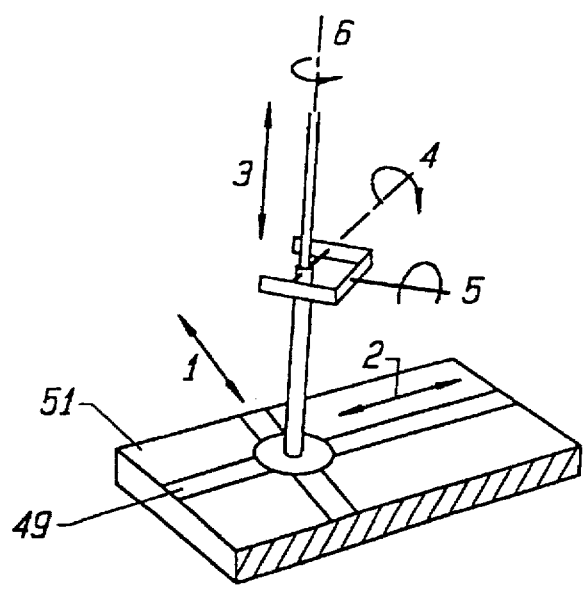
FIG. 7

METHOD AND APPARATUS FOR PROVIDING A CURSOR CONTROL INTERFACE WITH FORCE FEEDBACK

FIELD OF THE INVENTION

The present invention relates to a computer-human interface device, and more particularly it relates to a stylus coupled to a supportable mechanical linkage for providing commands to a computer.

BACKGROUND OF THE INVENTION

As the use of Computer Aided Design (CAD) Systems becomes more widespread, the need for cursor and command control devices which accurately and easily track three-dimensional position or motion is also growing. Devices which allow users to control a cursor with three-dimensional position and/or orientation commands are available for various applications. Among them are many hand-held input devices which allow users to interact with a host processor by controlling the position of a cursor or manipulating graphic objects on a computer screen. While these devices allow three-dimensional information to be transmitted to a computer they do not allow the user to use gestures and motions which are natural to the user.

For example, a prior art device of the type which is used for three-dimensional control involves the use of accelerometers to transduce the position and orientation of a stylus in space as described in U.S. Pat. No. 4,839,838. This device makes no provisions so the stylus can be grasped in a manner which makes use of finger dexterity nor does it include mechanical support to reduce fatigue or enhance user control or dexterity.

Another prior art example is an ultrasonic position-locating device like the one shown in U.S. Pat. No. 5,142, 506. This device transduces position and orientation by triangulating ultrasonic signals. As with the prior art previously described, this device uses a free-floating stylus which includes no provisions for mechanical support to reduce fatigue or enhance user control or dexterity. Furthermore, this device is used with a stylus that is grasped in the palm of the hand. The use of such a stylus precludes fine positioning with the fingers and greatly reduces the dexterity of the user to manipulate position and orientation. In addition, this device is used with digital buttons on the stylus to send to the computer command signals. A button of this type is commonly called a "clicker" on a "mouse." Because such buttons are mechanically coupled to the free-floating stylus, it is difficult to push the buttons while maintaining the position and orientation of the stylus. By pushing down on the button, the user will necessarily move the stylus from its desired position. Accordingly, these commands are difficult to control under many circumstances.

SUMMARY OF THE INVENTION

In the present invention, the user holds a stylus which is supported by a support apparatus on a fixed surface so that the user can easily manipulate the stylus in free space to interact with a computer. The three-dimensional motion of the user is translated through the stylus and mechanical linkage to a processor which communicates with the computer, thus allowing commands to be sent to the computer which track the three-dimensional motion of the user. Therefore, cursor control in three-dimensions on the two-dimensional computer screen is possible.

In one embodiment, the stylus is supportable on a fixed surface by a set of mechanical linkages which include individual components joined together by a sufficient number of joints to allow several degrees of freedom in the motion of the stylus. These mechanical linkages provide mechanical leverage, friction, counter-weighing, and/or spring resistance in order to reduce fatigue of the user and to provide support to enhance the stability and dexterity of user manipulation of the stylus.

In the aforementioned embodiment of the present invention, the joints of the mechanical linkages are coupled to sensors which provide information about their position. Such information is transmitted to a microprocessor so that position and orientation of the stylus can be computed using kinematic equations associated with or related to the particular linkage system. In another embodiment, position and orientation of the stylus is sensed through the use of ultrasonic, magnetic, or optical position and orientation sensors mounted on the stylus.

An embodiment of the present invention includes computer software and hardware which will provide force feedback information from the computer to the stylus. The computer sends feedback signals to the mechanical linkage which has force generators for generating force in response to images depicted on the computer screen. Incoming commands from the host computer are monitored by the microprocessor and instruct the microprocessor to report forces felt by a joint or set forces on a joint of the mechanical linkage.

Another aspect of the present invention includes a remote control unit which is used in place of a command clicker on the stylus. For example, a foot pedal or hand-held unit for the user's opposite hand is included to provide command control to the computer. Accordingly, manual dexterity of stylus manipulation is not compromised.

DESCRIPTION OF THE DRAWINGS

FIGS. 4A and 4B are flow charts describing two different interrupt service routines for serial output to host computer;

FIG. 5 is a perspective representation of another embodiment of the present invention;

FIG. 6 is a perspective view of still another embodiment of the present invention;

FIG. 7 is a perspective representation of another embodiment;

DESCRIPTION OF PREFERRED EMBODIMENTS

Figure 1:
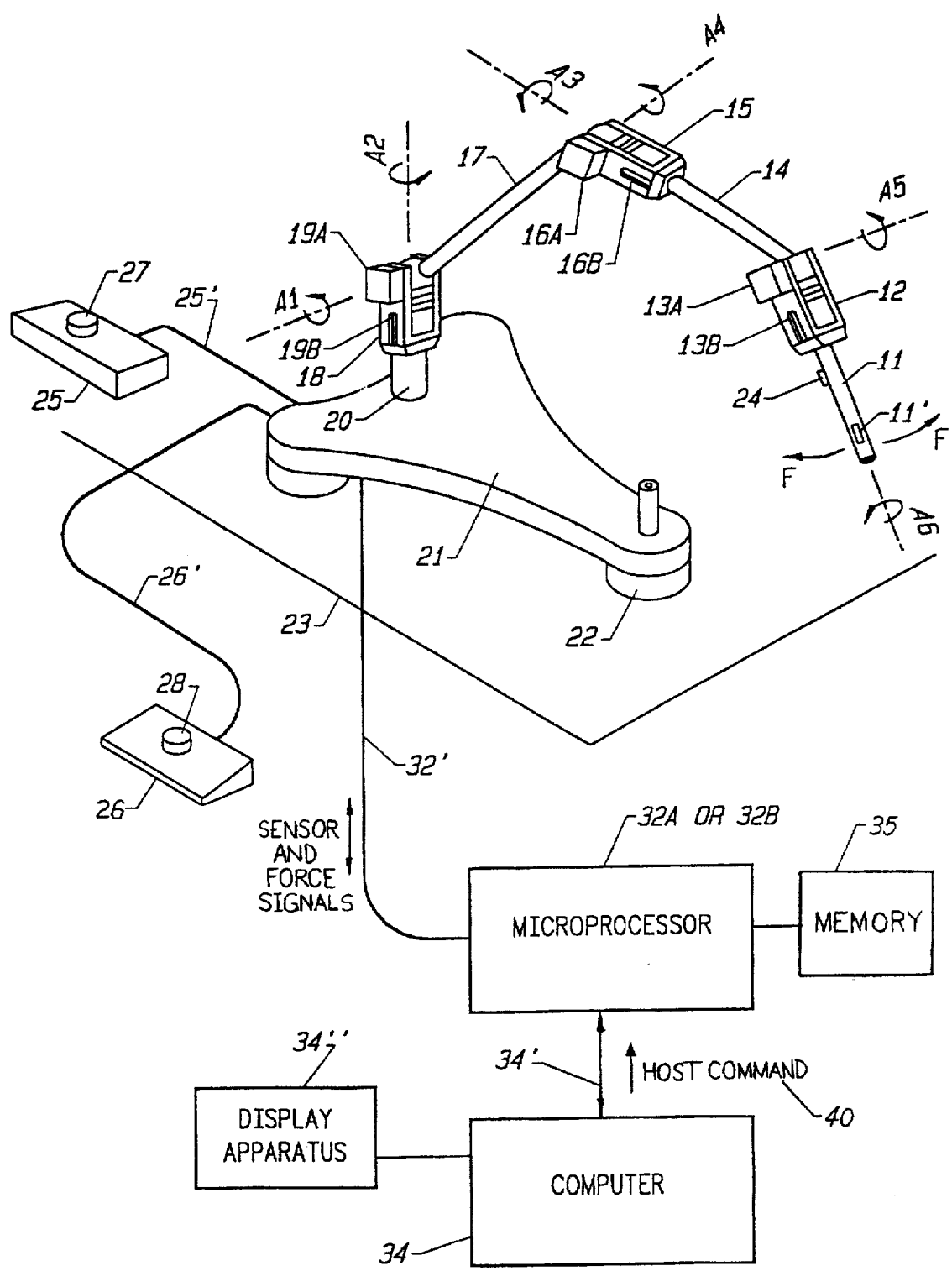
FIG. 1 is a perspective view of an embodiment of the present invention.

Referring to FIG. 1, a stylus 11 is shown attached to a support apparatus which is, in turn, supported on a fixed surface. By electrical and electronic configurations described below, the stylus 11 is adapted to provide data from which a computer or other computing means such as a microprocessor can ascertain the position and orientation of the stylus as it moves in three-dimensional space. This information is then translated to an image on a computer display apparatus. The stylus 11 may be used, for example, by an operator to change the position of a cursor on a computer controlled display screen by changing the position and/or orientation of the stylus, the computer being programmed to change the position of the cursor in proportion to the change in position and/or orientation of the stylus. In other words, the stylus 11 is moved through space by the user to designate to the computer how or where to move the cursor on a computer display apparatus.

Also contemplated in the present invention is computer software and hardware which will provide feedback information from the computer to the stylus and cause forces on the stylus. This implementation is described in greater detail subsequently.

The stylus 11 is a pen-like stick which can be manipulated between the fingers, allowing for much better control and fine dexterity as compared to full hand grips or palm-supported styluses used by some prior art inventions. While the stylus 11 is described in terms of manual manipulation, other stylus configurations are envisioned by the present invention. In particular, this invention includes manipulation by those unable to manually manipulate a pen. A stylus of the present invention, need not be linear, but may be curved or angled so that it may be held, for example, by the foot or the mouth of a person.

Because the stylus is supported by a support apparatus which is in turn supported by a fixed surface or other stabilizing configuration, the user can manipulate the stylus with a minimum of effort. Also, if the user chooses to discontinue using the stylus, it is capable of maintaining its position in space, unattended. While FIG. 1 shows that preferred embodiment of the present invention, FIGS. 5-8 show alternative embodiments, such which are also contemplated under the present invention. It is preferable that the stylus have enough degrees of freedom to enable it to move through the mechanical linkage to give the user the amount of flexibility needed to move the cursor as desired. In FIG. 1, six degrees of freedom are shown and are labeled as Axes A1, A2, A3, A4, A5, and A6. This, of course, provides maximum flexibility. Fewer degrees of freedom, such as a plurality of degrees of freedom, may also be sufficient depending on the application.

In one embodiment, the stylus is connected to rigid individual components which are joined together by joints. While not shown, other types of support apparatus' are included in the present invention. For example, other configurations include a semi-flexible rod or any other moveable while supportive configuration which can support the stylus in the manner described herein.

In FIG. 1, a mechanical linkage pursuant to the present invention is depicted. The stylus 11 is coupled to supportable mechanical linkages via joint 12 which, in the shown embodiment, houses sensors 13A and 13B. Linkage 14, is connected, via joint 15 having position sensors 16A and 16B, to linkage 17. Joint 18 in turn connects linkage 17 with the vertical base protrusion 20 which emanates from the base 21. The sensors are used to produce a stylus locative signal which is responsive to and corresponds with the position of the stylus at any point in time during its normal operation. The stylus locative signal is used to provide information for use by a computer display apparatus of a computer. The term "joint" as used herein is intended to mean the connection mechanism between individual linkage components. In fact, two separate moveable members can be joined; such together forming a joint.

The base 21, if necessarily, can be immobilized by securing it onto the fixed surface 23 by way of bolt, screw or other attachment mechanism 22. Moreover, the present invention implements mechanical leverage and rubbing friction (not shown) between the supportable mechanical linkages 14 and 17 and the joints 12, 15 and 18 in order to provide resistance and support so as to allow better dexterity than can be achieved with free-floating stylus trackers. This support and leverage aids in reducing the fatigue associated with manipulating the free-floating stylus 11.

As mentioned above, attached to each joint 12, 15 and 18 are sensors 13A, 13B, 16A, 16B, 19A, and 19B, respectively. These sensors sense the angle differential before and after motion of the two segments connected by that joint. The sensors can be, for example, optical incremental encoders, optical absolute encoders and potentiometers. Because the three-dimensional position and/or orientation tracking is achieved mechanically, this preferred embodiment avoids problems that magnetic and ultrasonic sensors, such as those shown in the prior art, encounter with metal and shadowing. However, as shown in FIG. 1, if desired, sensing means can be used to track the position and/or orientation of the stylus by mounting a single or several orientation sensors in the stylus 11 itself, such referred to as a stylus mounted sensor 11'. An ultrasound, magnetic, optical or position and orientation sensor can be used as the stylus mounted sensor 11'.

FIG. 1 also shows a clicker button 24 on stylus 11. The button is connected to a switch which when in the on state, sends a signal to the computer giving it a command. In order to provide for accuracy when sending commands, this invention also includes a remote clicker unit. Therefore, since the clicking motion occurs at a distant location from the cursor control, there is little or no opportunity to accidently move the cursor while making a command. FIG. 1 shows two configurations for implementing this aspect of the present invention. The first is identified as an alternate hand-clicker 25, the second as foot pedal 26.

Digital buttons 27 and 28 which are connected to switches (not shown) on the remote attached peripherals such as a hand-held clicker unit 25 or a foot pedal 26, respectively, can generate additional digital input such transmitted through lines 25' and 26' respectively. Either of the shown ancillary remote command units, such including the hand unit 25 and the foot pedal 26 configurations, are favorable methods of inputting digital commands by command hardware or software (not shown) because pressing the button 27 or 28 does not compromise a user's ability to hold the stylus steady whereas pressing any button 24 on the stylus does compromise stylus stability.

Figure 2A:
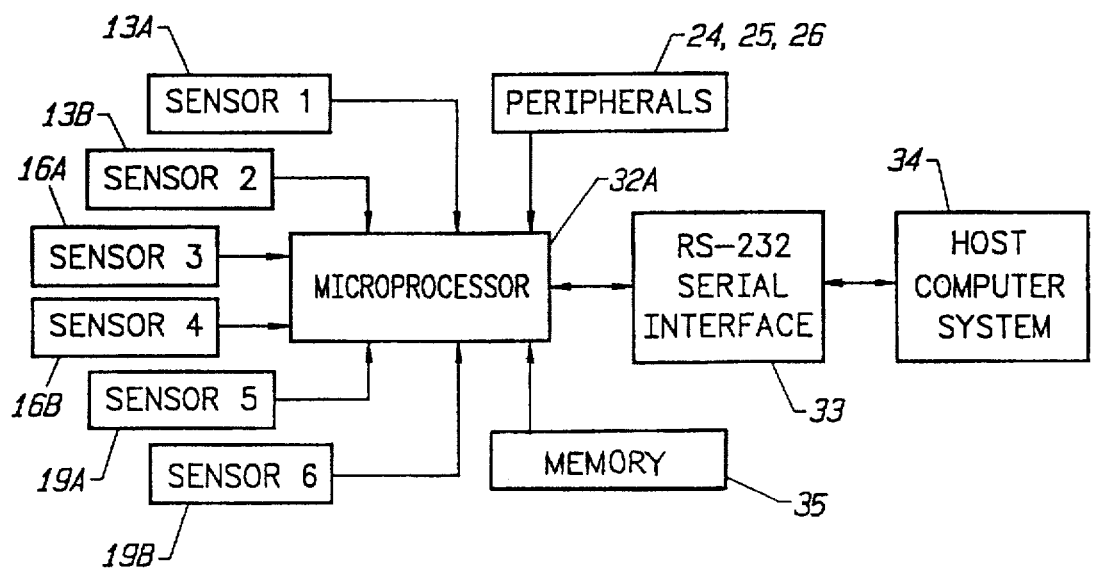
FIGS. 2A and 2B are block diagrams over-viewing two different electronic hardware configurations of the present invention.
Figure 2B:
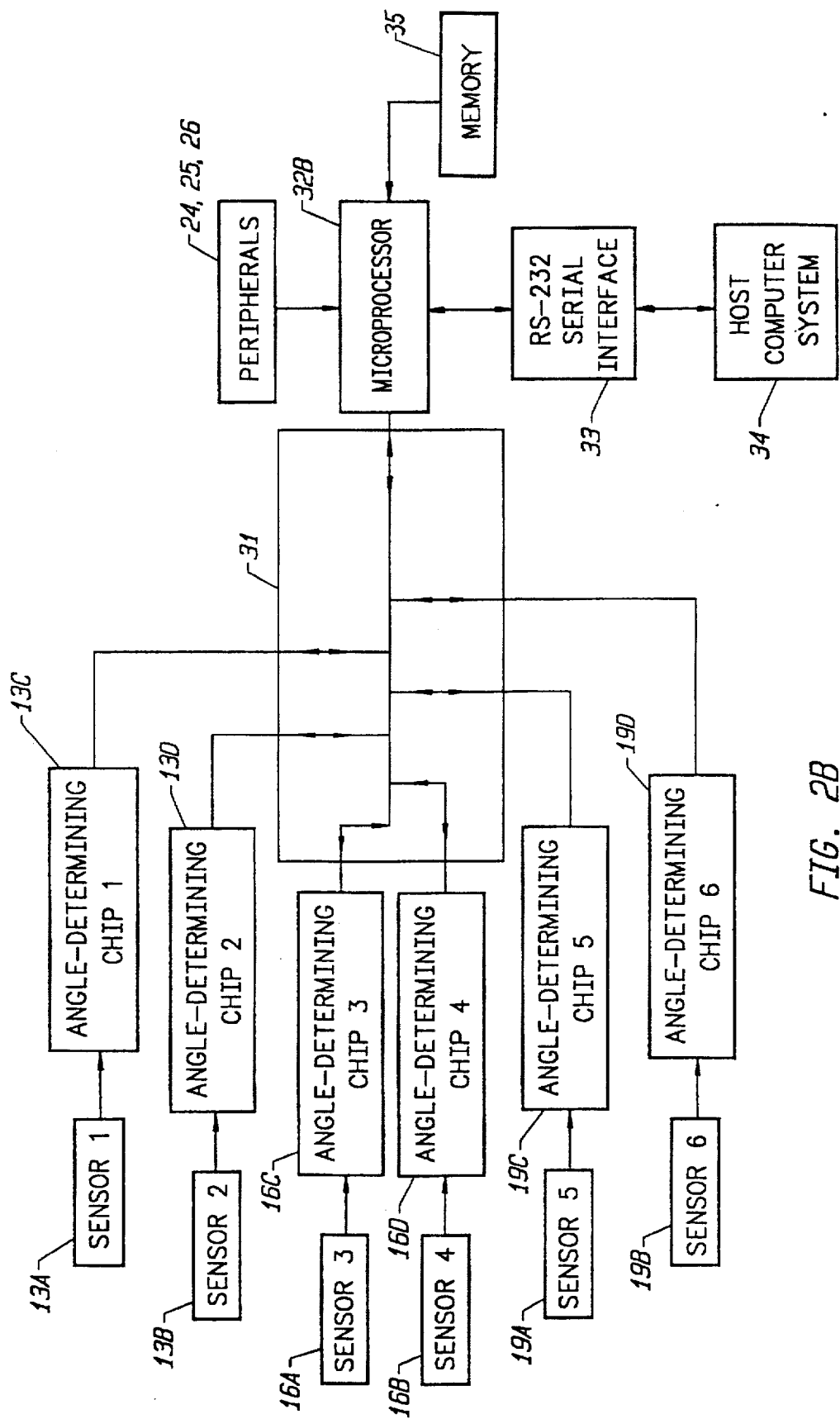

Referring to FIG. 2A, the sensors 13A, 13B, 16A, 16B, 19A and 19B, along with any peripherals 24, 25 or 26, can send their digital signals directly to a versatile floating-point processor or microprocessor 32A which is controlled by software stored in a digital ROM (Read-Only Memory) 35 via transmission line 32' or another form of transmission, i.e., radio signals. As shown in FIG. 2B, an alternative embodiment can be used to lessen the demands on the floating-point processor or microprocessor 32B. The digital inputs of the sensors 13A, 13B, 16A, 16B, 19A and 19B can be sent indirectly to the floating-point processor or microprocessor 32B by way of dedicated chips 13C, 13D, 16C, 16D, 19C and 19D, which pre-process the angle sensors' signals before sending them via bus 31 to the floating-point processor or microprocessor 32B which would combine these signals with those from the peripherals 24, 25 or 26. An 8-bit data bus plus chip-enable lines allow any of the angle determining chips to communicate with the microprocessor. Moreover, reporting the status of peripherals 24, 25 or 26 includes reading the appropriate digital switch and placing its status in the output sequence array. Some examples of specific electronic hardware usable for sensor pre-processing include quadrature counters, which are common dedicated chips that continually read the output of an optical incremental encoder and determine an angle from it, Gray decoders, filters, and ROM look-up tables.

The single-chip configuration of FIG. 2A is most applicable where the angle sensors 13A, 13B, 16A, 16B, 19A and 19B are absolute sensors, which have output signals directly indicating the angles without any further processing, thereby requiring less computation for the microprocessor 32A and thus little if any pre-processing. The multi-chip configuration of FIG. 2B is most applicable if the sensors 13A, 13B, 16A, 16B, 19A and 19B are relative sensors, which indicate only the change in an angle and which require further processing for complete determination of the angle.

In either configuration, if the microprocessor 32A or 32B is fast enough, it will compute stylus 11 position and/or orientation (or motion, if desired) on board the embodiment and send this final data through any standard communications interface such as an RS-232 serial interface 33 on to the host computer system 34 and to computer display apparatus 34" through transmission line 34' or another form of transmission. If the microprocessor 32A or 32B is not fast enough, then the angles will be sent to the host computer 34 which will perform these calculations on its own.

In addition to the single-chip and multi-chip configurations, a variation may consist of a single microprocessor which reads the peripherals, obtains the angles, possibly computes coordinates and orientation of the stylus 11, and supervises communication with the host computer 34. Another variation may consist of dedicated sub-circuits and specialized or off-the-shelf chips which reads the peripherals, monitors the angle sensors 13A, 13B, 16A, 16B, 19A and 19B, determine the joint angles, and handle communications with the host computer 34, all without software or a microprocessor 32A or 32B.

Software is only included in the two microprocessor-based configurations shown in FIGS. 2A and 2B. The more dedicated hardware a given configuration includes, the less software it requires. The software consists of a main loop (FIG. 3) and an output interrupt (FIGS. 4A and 4B).

Figure 3:
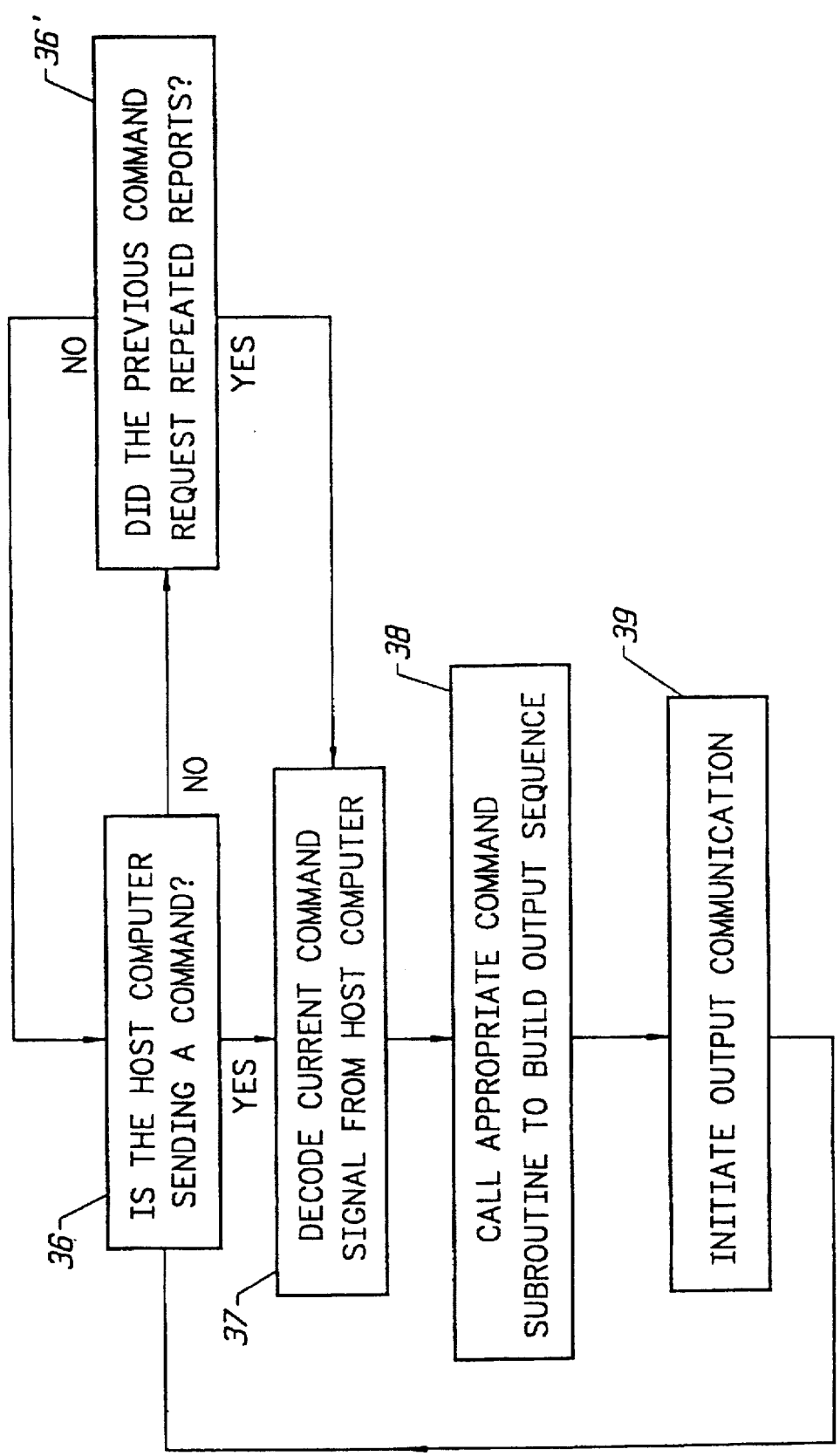
FIG. 3 is a flow chart describing the main software command loop for two different electronic hardware configurations shown in FIG. 2.

Referring to FIG. 3, the main command loop responds to the host computer 34 and runs repeatedly in an endless cycle. With each cycle, incoming commands 40 from the host computer are monitored 36 and decoded 37, and the corresponding command subroutines for reporting angles, thus stylus position and/or orientation (see FIGS. 4A (single-chip method) and 4B (multi-chip method)), are then executed 38. Two possible subroutines are shown in FIGS. 4A and 4B. When a subroutine terminates, the main command loop resumes 39. Available command will include but are not limited to: reporting the value of any single angle, reporting the angles of all six angles at one time, reporting the values of all six angles repeatedly until a command is given to cease aforementioned repeated reporting, reporting the status of peripheral buttons, and setting communications parameters. If the angle sensors require preprocessing, these commands will also include resetting the angle value of any single angle or otherwise modifying preprocessing parameters in other applicable ways. Resetting pre-processed angle values or preprocessing parameters does not require output data from the device. The microprocessor 32A or 32B simply sends appropriate control signals to the preprocessing hardware 13C, 13D, 16C, 16D, 19C, and 19D. If the microprocessor or floating-point processor is fast enough to compute stylus coordinates and orientation, these commands will also include reporting the stylus coordinates once, reporting the stylus coordinates repeatedly until a command is given to cease, ceasing aforementioned repeated reporting, reporting the stylus coordinates and orientation once, reporting the stylus coordinates and orientation repeatedly until a command is given to cease, and ceasing aforementioned repeated reporting. If force reflection is supported, these commands will also include reporting the forces felt by any single joint, setting the resistance of any single joint, and locking or unlocking a joint.

Any report by the subroutines of FIGS. 4A and 4B of a single angle value requires determining 41 the given joint angle. For the single-chip configuration shown in FIG. 2A, this subroutine directly reads the appropriate angle sensor 42 from among sensors 13A, 13B, 16A, 16B, 19A, and 19B. For the multi-chip configuration shown in FIG. 2B, this subroutine reads the outputs 43 of pre-processing hardware 13C, 13D, 16C, 16D, 19C, and 19D which have already determined the joint angles from the outputs of the sensors 13A, 13B, 16A, 16B, 19A, and 19B. Any report of multiple angles is accomplished by repeatedly executing the subroutine for reporting a single angle. The subroutine is executed once per angle, and the values of all angles are then included in the output sequence array. If the optional parts of the subroutines 45 are included, then these subroutines become the coordinate reporting subroutines. Many other command subroutines exist and are simpler yet in their high-level structure.

After determining the given joint angle, the microprocessor 32A or 32B creates an output sequence 44A or 44B by assembling an array in a designated area of processor memory 35 which will be output by the microprocessor's communications system at a given regular communications rate. The sequence will contain enough information for the host computer 34 to deduce which command is being responded to, as well as the actual angle value that was requested. Returning to FIG. 3, a query 36 in the main command loop asks whether the previous command requested repeated reports. If so, the main command loop is initiated accordingly. The communications output process (not shown) may be as simple as storing the output data in a designated output buffer, or it may involve a standard set of communications interrupts that are an additional part of the software. Setting communications parameters does not require output data from the device. The microprocessor 32A or 32B simply resets some of its own internal registers or sends control signals to its communications sub-unit.

To report the stylus' 11 coordinates, three of the five or six angle values are pre-read and knowledge of link lengths and device kinematics are incorporated to compute stylus 11 coordinates. These coordinates are then assembled in the output sequence array.

To report the stylus' 11 orientation, at least five angle values are read and knowledge of link lengths and device kinematics are incorporated to compute stylus 11 orientation. The orientation consists of three angles (not necessarily identical to any joint angles) which are included in the output sequence array.

Forces felt by a joint are reported, setting a joint's resistance, and locking or unlocking a joint are accomplished by using interaction of the microprocessor 32A or 32B with force-reflecting hardware. Reporting forces felt by a joint uses a force sensor mounted on the joint and then places the resulting value in the output sequence array. To set a joint's resistance and lock or unlock a joint, control signals are used to control force-reflection hardware and do not require any output data from the device.

Also contemplated in the present invention is computer software and hardware which will provide feedback information from the ocmputer to the stylus, such as host command 40 (shown in FIG. 1). This type of implementation is known in robotics and thus is easily incorporated into a system including the present invention. When a surface is generated on the computer screen, the computer will send feedback signals to the mechanical linkage which has force generators identified by numerals 13A, 13B, 16A, 16B, 19A, and 19B (which also identifies the sensors, see above) for generating force (F see FIG. 1) in response to the cursor position on the surface depicted on the computer screen. Force is applied for example, by added tension in the joints which is in proportion to the force being applied by the user and in conjunction with the image on the screen.

Figure 8:
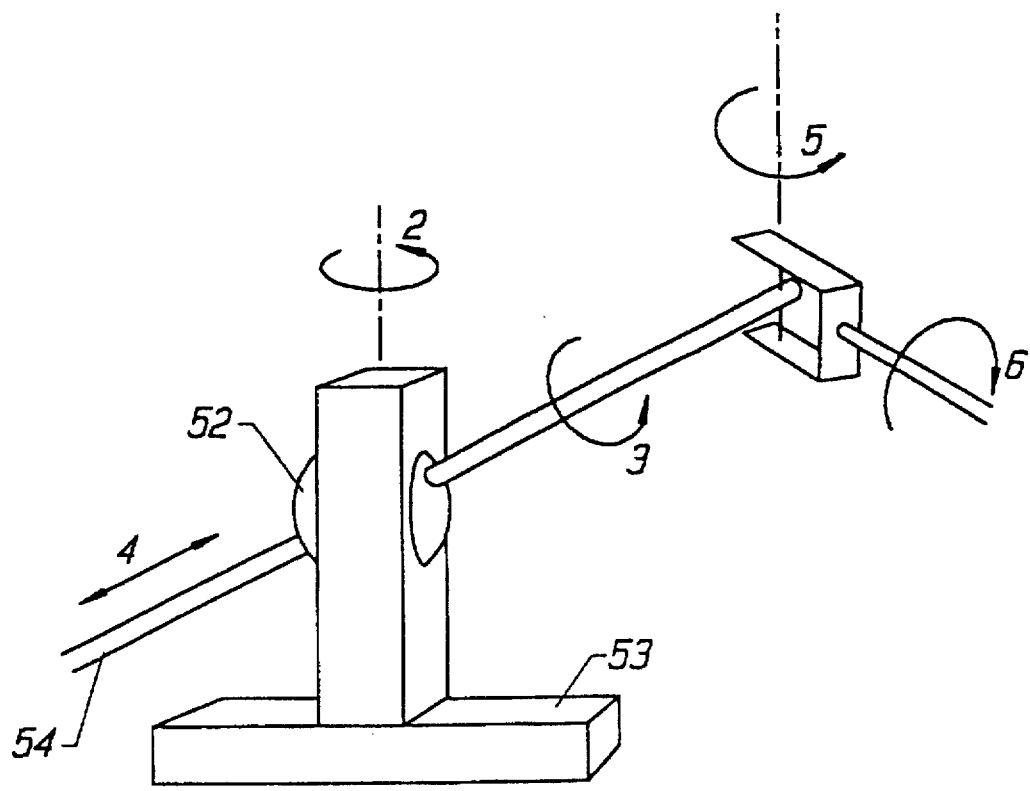
FIG. 8 is a perspective view of another embodiment.

The various configurations of the mechanical linkages shown in FIG. 5, FIG. 6, FIG. 7 and FIG. 8 which have different numbers of individual components and joints than shown in FIG. 1 are illustrative of the numerous possible configurations which can provide varying degrees of freedom inherent in the present invention. Referring to FIG. 5, FIG. 6 and FIG. 8, note that a rounded object such as a ball can act as a joint having motion in three degrees of freedom. In conjunction with other mechanical linkages and attachments, this permits sufficient degrees of freedom for the purposes of the present invention. In each figure, the orientation of the degrees of freedom of each joint is depicted by curved lines, numbered consecutively.

Briefly, FIG. 5 an embodiment having 6 rotary joints including a rounded joint 46 at the base such that three degrees of motion are available at that joint. FIG. 6 shows an embodiment having 5 rotary joints and one linear joint, including a shows three-dimensionally rotatable rounded joint 47 at the base through which one mechanical linkage can slide linearly and where the base is attached to a fixed surface 48 such that the surface does not an embodiment having 5 rotary joints and one linear joint, including prohibitively impede the movement of the device. FIG. 7 shows an embodiment having 3 rotary joints and 3 linear joints, where the basal connection can slide about the base in a two-dimensional plane in the cross configuration 49 on base 51. FIG. 8 shows an embodiment having 5 rotary joints and one linear joint, including a three-dimensionally rotatable rounded joint 52 at a perpendicular projection from the base 53 through which one mechanical linkage 54 can slide linearly through the joint 52.

Figure 9:
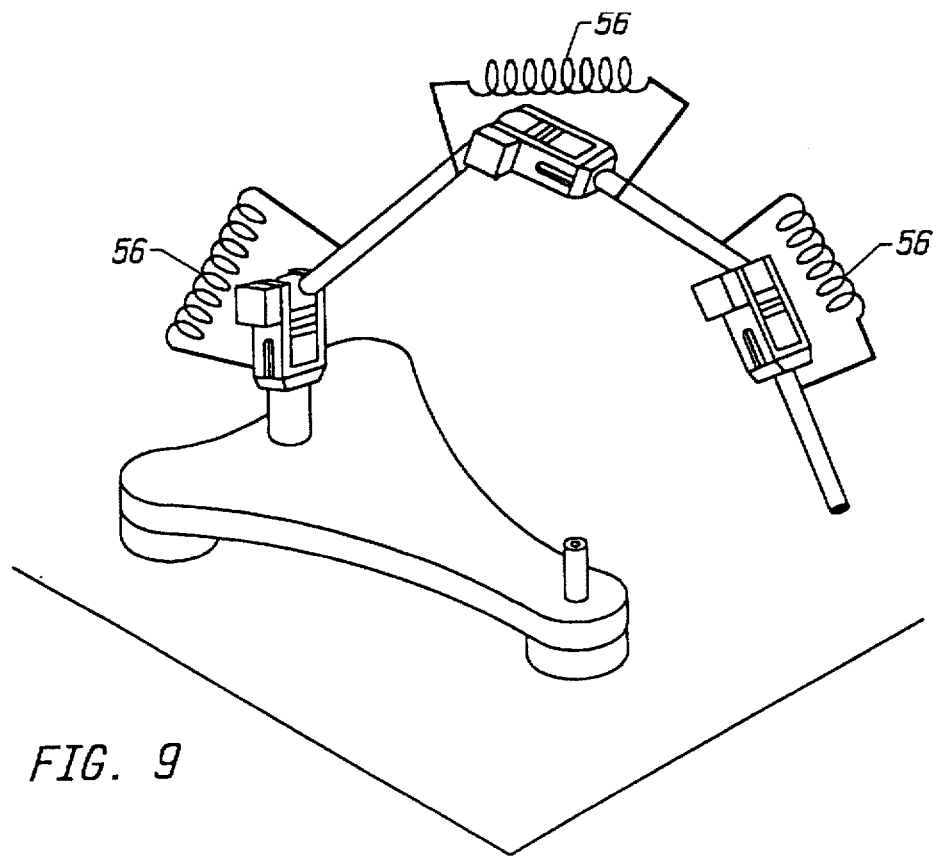
FIG. 9 shows an embodiment of the resistance mechanism of the present invention.
Figure 10:
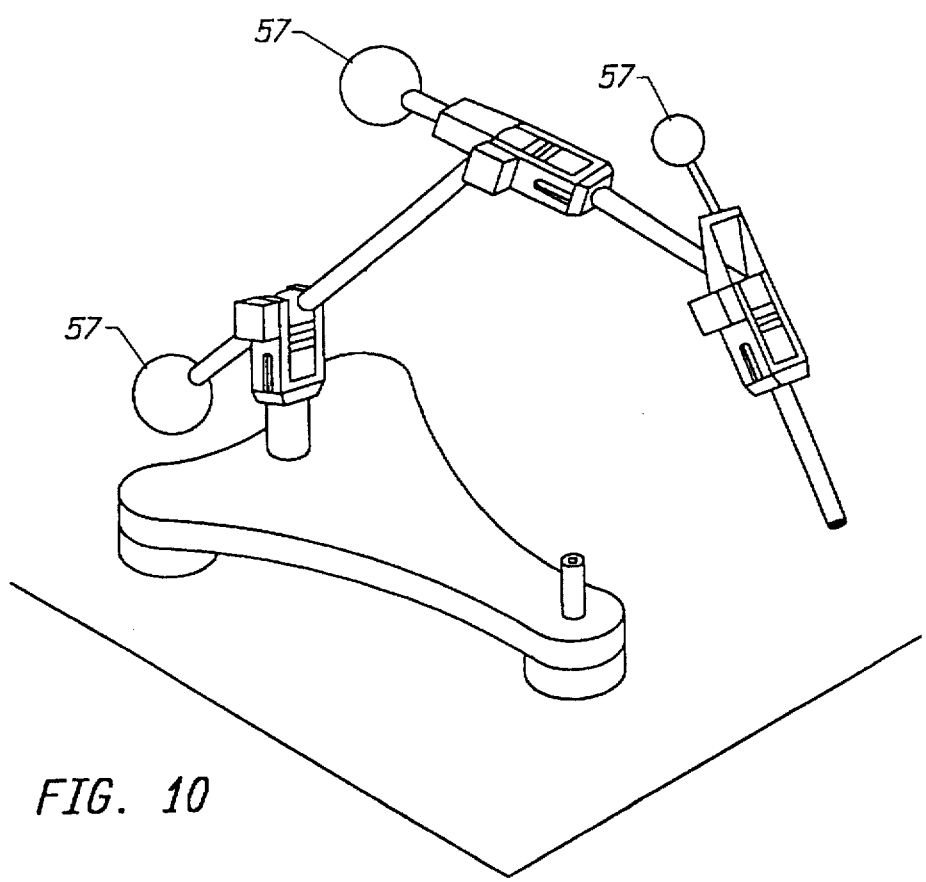
FIG. 10 shows another embodiment of the resistance mechanism.
Figure 11:
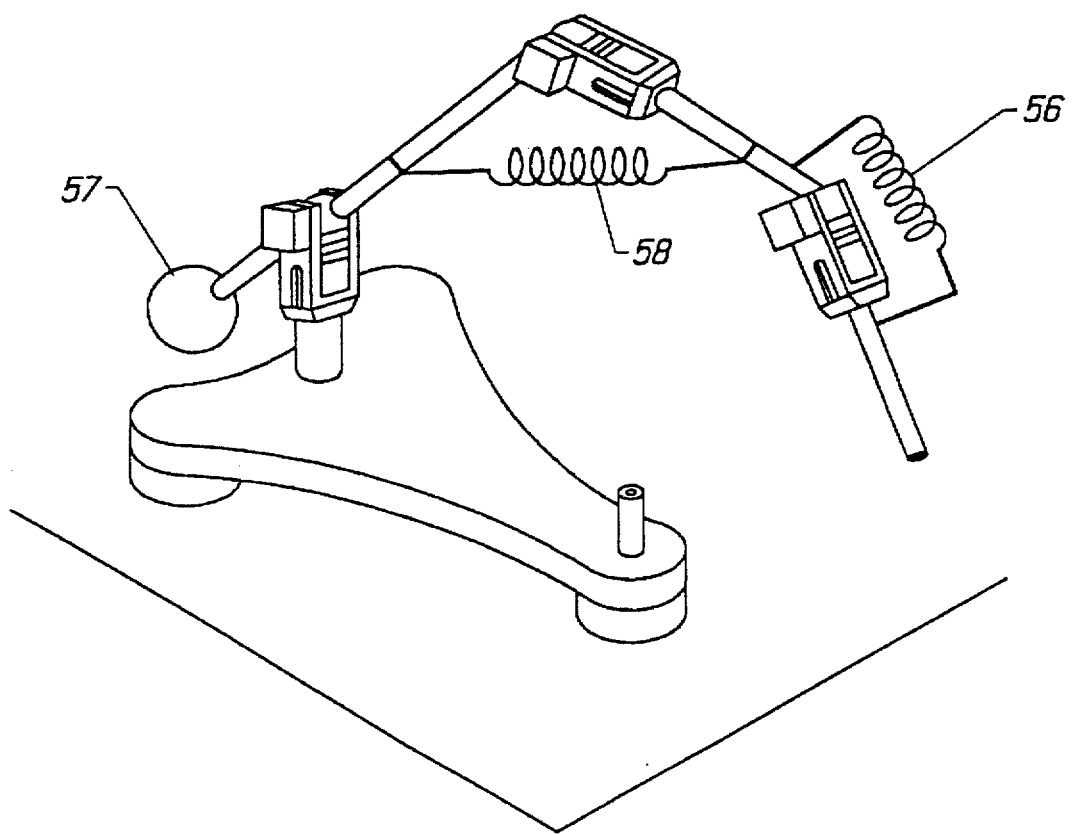
FIG. 11 shows yet another embodiment of the resistance mechanism.

While any of the above discussed configurations or others can be used in accordance with the present invention, FIGS. 9–11 show different mechanisms for providing resistance to the manual manipulation of the stylus by the user. FIG. 9, for example, shows return or tension springs 56 on each joint of the embodiment shown in FIG. 1. In an alternative embodiment, FIG. 10, shows counter-weights 57 on each joint. Moreover, FIG. 11, shows a combination of a return or tension spring 56, a counter-weight 57 and a compression spring 58. The arrangement of the resistance mechanism used should depend upon the configuration stylus mechanical linkage combination, such arrangement preferably chosen to maximize the ease with which the user can manipulate the stylus 11 in free space in accordance with the present invention.

What is claimed:

1. A human interface device for enabling manual interactions with application software running on a host computer, said software providing images displayed on a computer display, said device comprising:

(a) a user manipulatable physical object;
   (b) a support mechanism which supports said user manipulatable physical object while allowing a plurality of degrees of freedom of said user manipulatable physical object with respect to a surface;
   (c) a sensor apparatus coupled to at least one of said user manipulatable physical object and said support mechanism and that produces a locative signal responsive to and corresponding with the position of the user manipulatable physical object with respect to said surface at points in time during normal operation;
   (d) a communication bus coupled to said host computer;
   (e) a device microprocessor separate from said host computer and coupled to said host computer by said communication bus, said device microprocessor being coupled to said sensor apparatus, said device microprocessor running a program contained at least in part in a non-volatile memory coupled to said device microprocessor and separate from said host computer, said device microprocessor providing information for use by said host computer running an application program simultaneously with said microprocessor running said program, said information including a representation of said locative signal,
   wherein said application program of said host computer can provide images on a computer display, said images updated on said computer display in response to said locative signal, and
   wherein said host computer can provide host commands, said host commands being communicated to said device microprocessor by said communication bus, wherein said device microprocessor:
      (i) monitors said communication bus for said host commands; and
      (ii) decodes said host commands, wherein
         at least one of said host commands causes information to be reported from said device microprocessor to said host computer, and
         at least one of said host commands causes said device microprocessor to output control signals to cause a force to be imposed on said user manipulative physical object, said at least one host command and said force being correlated with at least one of said images developed by said host computer on said computer display; and
   (f) a force generator controlled by said device microprocessor for providing a resistance force to motion of said user manipulatable physical object in response to at least one of said control signals.

2. A device as recited in claim 1 wherein said support mechanism is a mechanical linkage coupled between said user manipulatable physical object and a fixed surface.

3. A device as recited in claim 2 wherein said sensor apparatus is coupled to said mechanical linkage.

4. A device as recited in claim 1 wherein said sensor apparatus is coupled to said user manipulatable physical object.

5. A device as recited in claim 1 further comprising:
a switch capable of being in an on state and an off state, said switch being coupled to said device microprocessor such that said device microprocessor can read said states of said switch and generate a command signal for receipt by said host computer in response to a state of said switch.

6. A device as recited in claim 5 wherein said switch comprises a foot pedal unit.

7. A device as recited in claim 2 wherein said mechanical linkage includes a joint with two rotary degrees of freedom, wherein one of said rotary degrees of freedom is coupled to said surface.

8. A device as recited in claim 7 wherein a sensor included in said sensor apparatus is associated with each of said rotary degrees of freedom.

9. A device as recited in claim 1 wherein said user manipulatable physical object has a pencil-like stylus configuration that can be manually manipulated by a user of said device.

10. A device as recited in claim 1 wherein said force generator transmits a force via said support mechanism in response to said force signals, and wherein said force signals are correlated to information displayed on said computer display said information including a cursor interacting with a graphical surface.

11. A device as recited in claim 1 wherein said device microprocessor reads said locative signal directly from said sensor apparatus.

12. A device as recited in claim 11 wherein said device microprocessor computes the position or orientation of said user manipulatable object from said locative signal produced by said sensor apparatus, said microprocessor reporting said position or orientation to said host computer.

13. A device as recited in claim 2 wherein said device microprocessor has access to information describing physical dimensions of said support mechanism and information of device kinematics such that said locative signal produced by said sensor apparatus can be converted into coordinate data describing a position of said physical object.

14. A device as recited in claim 11 wherein said device microprocessor computes a motion of said user manipulatable object and reports said motion to said host computer.

15. A device as recited in claim 1 wherein said device microprocessor supervises communication with said host computer.

16. A device as recited in claim 1 wherein said device microprocessor implements a command loop that monitors and decodes host commands received by said microprocessor from said application program on said host computer.

17. A device as recited in claim 16 wherein said device microprocessor executes a routine stored in said non-volatile memory based on said host command.

18. A device as recited in claim 17 wherein said routine processes said locative signal into angle data, and wherein said routine sends a single set of said angle data to said host computer.

19. A device as recited in claim 17 wherein said routine processes said locative signal into angle data, and wherein said routine continually reports said angle data from said device microprocessor to said host computer until commanded by said host computer to cease said reporting.

20. A device as recited in claim 17 wherein said locative signal is included in raw data provided by said sensor apparatus, wherein said device microprocessor reports a single set of said raw data or a single set of angle data, processed from said raw data, to said host computer.

21. A device as recited in claim 17 wherein said locative signal is included in raw data provided by said sensor apparatus, wherein said device microprocessor continually reports said raw data or continually reports angle data that is processed from said raw data to said host computer.

22. A device as recited in claim 1 wherein at least one of said host commands sets parameters on said device microprocessor.

23. A device as recited in claim 11 wherein said device includes a memory device accessible to said microprocessor and wherein said microprocessor stores sensor data representative of said locative signal in said memory device.

24. A device as recited in claim 22 wherein said host command from said host computer causes an internal register on said microprocessor to be set.

25. A device as recited in claim 22 wherein said host command from said host computer causes said device microprocessor to send control signals to a communications sub-unit of the microprocessor to provide data to said host computer.

26. A device as recited in claim 20 wherein said host command is decoded by said microprocessor, said host command calling a subroutine stored on said microprocessor to change the resistance at a joint of said support mechanism.

27. A device as recited in claim 1 wherein said host computer interacts with said force generator by sending a command to said microprocessor, said microprocessor decoding said command and running a subroutine to control said force feedback.

28. A device as recited in claim 1 wherein forces commanded by said host computer to said device microprocessor and felt by said user correspond to images displayed on said computer display.

29. A device as recited in claim 28 wherein said images include a cursor interacting with another object displayed on said display screen.

30. A device as recited in claim 29 wherein said cursor interacts with a surface image displayed on said display screen.

31. A device as recited in claim 1 wherein said parameters are communication parameters for communicating with said host computer.

32. A device as recited in claim 5 wherein at least one of said host commands causes said device microprocessor to report a state of said switch to said host computer.

33. A device as recited in claim 9 wherein a button is provided on said stylus, and wherein when said button is activated, the current position of said stylus is reported to said microprocessor and reported from said microprocessor to said host computer.

34. A device as recited in claim 1 wherein said physical object is capable of moving in only two degrees of freedom with respect to said surface.

35. A device as recited in claim 34 wherein said two degrees of freedom are rotary degrees of freedom.

36. A device as recited in claim 34 wherein said two degrees of freedom are linear degrees of freedom.

37. A device as recited in claim 1 wherein said physical object is capable of moving in six rotary degrees of freedom with respect to said surface.

38. A device as recited in claim 1 wherein said interface device includes springs operative to provide resistance to movement of said physical object in addition to said force provided by said force generator.

39. A device as recited in claim 1 wherein said interface device includes counterweights to reduce an adverse influence of gravity when said user moves said physical object.

40. A device as recited in claim 1 wherein said device microprocessor stores sensor data representative of said locative signal in said memory device including multiple locative values while said device microprocessor waits to send at least a representation of said values to said host computer.

41. A device as recited in claim 40 wherein said multiple locative values includes information such that said host computer can determine which of said host commands said multiple locative values are in response to.

42. A method for interfacing a user and a host computer including a computer display comprising:
   providing a user manipulatable physical object supported by a support apparatus which allows at least a plurality of degrees of freedom in the motion of said user manipulatable physical object;
   producing an object locative signal corresponding with the position of the user manipulatable physical object at points in time during its normal operation, said object locative signal providing information for use by a host computer including a computer display which can be used by an application program running on said host computer to control images on said computer display;
   providing a force feedback command from said host computer implementing a display process for displaying images on said computer display, said force feedback command being correlated to at least one of said images on said computer display;
   parsing said force feedback command on a processor under at least partial control of a program stored in non-volatile memory, said processor and said non-volatile memory being located at said support apparatus and being entirely separate from said host computer, to develop force signal for controlling a force generator to cause a force to be exerted on said user manipulatable physical object that is correlated to an image on said computer display, said program in said non-volatile memory being executed simultaneously with said display process on said host computer.

43. A method as recited in claim 42 wherein said support apparatus comprises a mechanical linkage.

44. A method as recited in claim 43 wherein said locative signal is generated by a sensor apparatus that is coupled to said mechanical linkage.

45. A method as recited in claim 42 wherein said locative signal is generated by a sensor apparatus that is coupled to said user manipulatable physical object.

46. A method as recited in claim 42 further comprising providing a switch capable of being in an on state and an off state, said states of said switch read by said device microprocessor; and
   providing a command signal from said device microprocessor to said host computer in response to manipulation of said switch by said user.

47. A method as recited in claim 46 wherein said switch is located on said user manipulatable physical object.

48. A method as recited in claim 1 wherein said mechanical linkage includes a joint with two rotary degrees of freedom, wherein one of said rotary degrees of freedom is coupled to said surface.

49. A method as recited in claim 48 wherein said object locative signal includes signals from a sensor associated with each of said rotary degrees of freedom.

50. A method as recited in claim 42 wherein said force exerted on said user manipulatable physical object comprises a resistance to the motion of said user manipulatable physical object.

51. A method as recited in claim 42 wherein said user manipulatable physical object has a pencil-like stylus configuration that can be manually manipulated.

52. A method as recited in claim 45 wherein said force feedback command from said host computer is received by a microprocessor which causes said force to be exerted on said physical object, said microprocessor receiving said object locative signal and providing said object locative signal to said host computer.

53. A method as recited in claim 45 wherein said host computer issues a command to said microprocessor, and said microprocessor takes an action in response to said command.

54. A method as recited in claim 53 wherein said action includes reporting data back to said host.

55. A device for use in conjunction with a host computer including a computer display, said device comprising:
   a user manipulatable physical object;
   a support mechanism which supports said user manipulatable physical object while allowing a plurality of degrees of freedom in the motion of said user manipulatable physical object;
   a sensor apparatus coupled to at least one of said user manipulatable physical object and said support mechanism and that produces a locative signal responsive to and corresponding with the position of the user manipulatable physical object at points in time during normal operation;
   a device microprocessor coupled to said sensor apparatus such that said device microprocessor can read said locative signal from said sensor apparatus, said device microprocessor running a program contained, at least in part, in a non-volatile memory coupled to said device microprocessor, said device microprocessor providing information for use by a host computer running an application program which can provide images on a computer display, said application program providing force commands which can be communicated to said device microprocessor for parsing into force signals, wherein said program and said application program are running simultaneously;
   a force generator controlled by said device microprocessor for providing force feedback to said user manipulatable physical object in response to said force signals; and
   a memory device accessible to said device microprocessor;
   wherein said device microprocessor stores an output array of multiple locative values in said memory device while said device microprocessor waits to send a representation of said output array to said host computer.

56. A device as recited in claim 55 wherein multiple locative values includes information such that said host computer can determine which of said host commands said multiple locative values is in response to.

57. A device as recited in claim 55 wherein said multiple locative values are stored in a designated area of said memory for eventual output of said at least a representation of said values to said host computer.

58. A device as recited in claim 57 wherein said multiple locative values are stored as an output array.

59. A device as recited in claim 57 wherein said multiple locative values comprise angle values, and wherein each of said angle values is associated with a separate degree of freedom.

60. A device as recited in claim 59 wherein said multiple locative angles comprise coordinate values, each of said coordinate values being associated with a separate degree of freedom.

61. A multi-degree-of-freedom force feedback cursor control interface for use with a host computer running an application program which displays images on a display apparatus, said cursor control enabling a user to control the position of a cursor displayed by said host computer and enabling said host computer to convey force feedback to a user in accordance with said position of said cursor, said force feedback cursor control:

a user manipulatable physical object;

a support mechanism which supports said user manipulatable physical object while allowing a plurality of degrees of freedom in the motion of said user manipulatable object;

a sensor coupled to said user manipulatable physical object to provide a locative signal responsive to and corresponding with a user's manipulation of said user manipulatable object;

a force generator coupled to said user manipulatable physical object providing resistance to motion of said user manipulatable physical object in at least one of said degrees of freedom, said resistance corresponding to host commands from a host computer running an application program which displays images on an associated display apparatus;

a microprocessor separate from said host computer, coupled to said sensor, and interacting with said force generator, said microprocessor supervising communication between said cursor control and said host computer by monitoring and decoding said host commands received from said host computer and by sending data to said host computer, where at least one of said host commands sent by said host computer to said microprocessor is a force feedback command causing the setting of force resistance on said user manipulatable object, and wherein at least part of said data sent to said host computer is representative of the motion of said user manipulatable object, wherein said supervising and setting of force resistance occur simultaneously with said display of images on said display apparatus by said host computer, thereby allowing resistance to be output from said force generator in response to and in conjunction with cursor position on said display apparatus;

memory locally coupled to said microprocessor and separate from memory of said host computer for locally storing a representation of said locative signal; and a communication bus for coupling said microprocessor to said host computer, said bus being adapted to convey said force feedback commands from said host computer to said microprocessor and adapted to convey said data from said microprocessor to said host computer;

whereby said display apparatus of said host computer can display a cursor positioned in accordance with a position of said user manipulatable object such that force feedback commands are sent from said host computer to said cursor control in accordance with displayed cursor interaction with other display images on said display apparatus.

62. A force feedback cursor control interface device as recited in claim 61 wherein said local memory includes non-volatile memory.

63. A force feedback cursor control interface as recited in claim 62 wherein program instruction are stored in said non-volatile memory, said program instruction enabling communication between said microprocessor and said host computer and decoding at least one of said host commands.

64. A force feedback cursor control interface as recited in claim 61 wherein a plurality of command routines are stored in said local memory, at least one of said command routines allowing said microprocessor to control said force generator in accordance with at least one of said decoded host commands, and at least one of said command routines reporting data to said host computer in accordance with at least one of said decoded host commands.

65. A force feedback cursor control interface as recited in claim 61 wherein said force generator provides force upon said user manipulatable physical object by applying resistance to a rotary joint within said support mechanism.

66. A force feedback cursor control interface as recited in claim 61 wherein said communication bus is a serial interface.

67. A force feedback cursor control interface as recited in claim 61 further comprising a peripheral switch coupled to said user manipulatable physical object for providing input signals to said microprocessor when a user manipulates said peripheral switch, wherein said microprocessor reports it state of said switch to said host computer, said state causing said host computer to modify a displayed process.

68. A force feedback cursor control interface as recited in claim 61 wherein said user manipulatable physical object includes a stylus that can be moved by said user at least five degrees of freedom.

69. A force feedback cursor control interface as recited in claim 61 wherein said microprocessor is provided on board an interface device coupled to said user manipulatable physical object, said interface device being physically separate from said host computer and coupled to said host computer by said communication bus.

70. A force feedback cursor control interface as recited in claim 61 wherein said host command causes said microprocessor execute a routine to set communication parameters for communication between said microprocessor and said host computer.

71. A force feedback cursor control interface as recited in claim 61 wherein said host command causes said microprocessor to execute a routine to read said locative signal and provide said locative signal to said host computer.

72. A force feedback cursor control interface as recited in claim 61 wherein said user manipulatable physical object is coupled to a mechanical linkage having a plurality of joints, and wherein said host command causes said microprocessor to call and execute a routine to set a force on a joint of said mechanical linkage.

73. A force feedback cursor control interface as recited in claim 61 wherein said sensor is a potentiometer.

74. A force feedback cursor control interface as recited in claim 61 wherein said sensor is optical.

75. A force feedback cursor control interface is recited in claim 62 wherein said non-volatile memory contains a look-up table for processing said locative signal.

76. A multi-degree-of-freedom cursor control interface for use in conjunction with a host computer running an application program which displays images on a display apparatus, said cursor control interface enabling a user to control the position of a graphical image displayed by said host computer on said display apparatus and enabling said host computer to convey force feedback to a user in accordance with graphical image manipulation, said cursor control interface comprising:

a user manipulatable physical object grasped by a user;

a support mechanism coupled to said user manipulatable physical object, said support mechanism allowing a plurality of degrees of freedom in the motion of said user manipulatable physical object;

a force generator coupled to said user manipulatable physical object and providing force resistance to motion of said user manipulatable physical object in a plurality of said degrees of freedom in response to commands from said host computer and in coordination with said displayed graphical image;

a device microprocessor separate from said host computer and interacting with said force generator, said device microprocessor supervising communication between said cursor control interface and said host computer by monitoring and decoding said commands received from said host computer and by sending data to said host computer, wherein at least one of said commands sent from said host computer to said device microprocessor is a force feedback command causing the setting of force resistance on said user manipulatable object, and wherein at least part of said data sent to said host computer is representative of motion of said user manipulatable physical object, said decoding, sending, and setting occurring simultaneously with host computer control of said, graphical image, thereby allowing resistance to be output from said force generator in response to and in conjunction with graphical image manipulation on said display apparatus;

a communication bus connecting said device microprocessor and said host computer, said bus used in conveying said force feedback commands from said host computer to said device microprocessor;

a sensor apparatus coupled to said device microprocessor, said sensor apparatus providing said device microprocessor with a locative signal responsive to and corresponding with manipulation of said user manipulatable object; and local memory coupled to said device microprocessor and separate from host computer memory, said local memory locally storing a representation of said locative signal;

whereby said display apparatus coupled to said host computer displays a graphical image controlled by said host computer in accordance with said motion of said user manipulatable object, and wherein force feedback commands are sent from said host computer to said cursor control interface in accordance with said displayed graphical image.

77. A cursor control interface as recited in claim 76 further comprising:

a switch capable of being in an on state and an off state, said switch being coupled to said device microprocessor such that said device microprocessor can generate a command signal for receipt by said host computer in response to a state of said switch.

78. A cursor control interface as recited in claim 76 wherein device microprocessor reads said locative signal from said sensor apparatus according to a routine stored in said local memory.

79. A cursor control interface as recited in claim 78 wherein said device microprocessor has access to information describing physical dimensions of said support mechanism and information of device kinematics such that said locative signal produced by said sensor apparatus can be converted into coordinate data describing a position of said user manipulatable physical object.

80. A cursor control interface as recited in claim 76 wherein said host computer sends a command to said device microprocessor that sets communication parameters on said microprocessor for communicating with said host computer.

81. A cursor control interface as recited in claim 76 wherein said device microprocessor stores sensor data representative of said locative signal in said local memory including multiple locative values while said device microprocessor waits to send at least a representation of said data to said host computer, wherein said multiple locative values include information such that said host computer can determine which of said host commands said multiple locative values are in response to.

82. A cursor control interface as recited in claim 80 wherein when said host command is decoded by said microprocessor, said host command calls a routine stored in said local memory to change the resistance at a joint of said support mechanism.

83. A cursor control interface as recited in claim 76 wherein said graphical image on said display apparatus includes a cursor.

84. A cursor control interface as recited in claim 83 wherein forces commanded by said host computer to said device microprocessor and felt by said user correspond to said cursor interacting with another object displayed on said display screen.

85. A cursor control interface as recited in claim 84 wherein said cursor interacts with a surface image displayed on said display screen.

* * * * *

UNITED STATES PATENT AND TRADEMARK OFFICE
CERTIFICATE OF CORRECTION

PATENT NO.   : 5,701,140
DATED        : December 23, 1997
INVENTOR(S)  : Rosenberg et al.

It is certified that error appears in the above-indentified patent and that said Letters Patent is hereby corrected as shown below:

Title page, before "[51] Int. Cl." insert:

--         Related U.S. Application Data

[63] Continuation of Ser. No. 092,974, Jul. 16, 1993, abandoned.--

Column 1, line 5, before "FIELD OF THE INVENTION" insert:

--     CROSS REFERENCE TO RELATED APPLICATIONS

This application is a continuation of co-pending patent application 08/092,974, filed July 16, 1993, now abandoned.--

Signed and Sealed this

Nineteenth Day of May, 1998

*Attest:*

BRUCE LEHMAN

*Attesting Officer*       *Commissioner of Patents and Trademarks*

UNITED STATES PATENT AND TRADEMARK OFFICE
CERTIFICATE OF CORRECTION

PATENT NO. : 5,701,140
DATED : Dec. 23, 1997
INVENTOR(S) : Rosenburg, et al.

It is certified that error appears in the above-identified patent and that said Letters Patent is hereby corrected as shown below:

Column 1, line 9, after "providing", insert --and receiving--

Column 1, line 10, after "to", insert --and from--

Column 6, line7, change "190" to --19C--

Column 6, line 12, after "cease", insert --and--

Column 6, line 27, change "190", to --19C--

Column 7, line 12, change "ocmputer" to --computer--

Column 7, line 20, change "(F see FIG 1)" to --F(see FIG. 1--

Column 7, line 38, after "Fig. 5", insert --shows--

Column 7, line 42, after "a", delete "shows"

Column 7, line 45, after "not", delete "an embodiment having 5 rotary joints and one linear joint, including"

Column 12, line 50, after "wherein", insert --said--

Column 13, line 8, after "control", insert --comprising--

Column 13, line 58, change "display" to --displayed--

Column 13, line 64, change "instruction" to --instructions--

Column 14, line 10, change "it" to --a--

Column 14, line 24, after "user", insert --in--

Column 14, line 51, change "is" to --as--

UNITED STATES PATENT AND TRADEMARK OFFICE
CERTIFICATE OF CORRECTION

PATENT NO.  : 5,701,140
DATED       : Dec. 23, 1997
INVENTOR(S) : Rosenburg et al.

It is certified that error appears in the above-identified patent and that said Letters Patent is hereby corrected as shown below:

Column 15, line 23, after "said", delete —,—
Column 16, line 9, after "wherein", insert —said—

Signed and Sealed this

Twenty-third Day of March, 1999

*Attest:*

Q. TODD DICKINSON

*Attesting Officer*  Acting Commissioner of Patents and Trademarks